(12) United States Patent
Aoki (10) Patent No.: US 6,201,480 B1
(45) Date of Patent: Mar. 13, 2001

(54) SEAT WEIGHT MEASURING APPARATUS

(75) Inventor: Hiroshi Aoki, Echi-gun (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/275,787

(22) Filed: Mar. 25, 1999

(30) Foreign Application Priority Data

Mar. 26, 1998 (JP) .................................... 10-097012
Aug. 7, 1998 (JP) .................................... 10-234890

(51) Int. Cl.$^7$ .................................................. G08B 21/00
(52) U.S. Cl. ........................................... 340/667; 330/146
(58) Field of Search ................................. 340/665, 666, 340/667, 668; 702/42, 47, 53; 180/273, 290; 200/85 R; 330/146

(56) References Cited

U.S. PATENT DOCUMENTS

| | | | |
|---|---|---|---|
| 4,605,905 | * | 8/1986 | Aslan .................................. 330/146 |
| 5,570,903 | * | 11/1996 | Meister et al. ...................... 340/667 |
| 5,612,876 | * | 3/1997 | Zeidler et al. ...................... 340/667 |
| 5,624,132 | * | 4/1997 | Blackburn et al. ................. 340/667 |
| 5,739,757 | * | 4/1998 | Gloutsos ............................. 340/667 |
| 5,821,432 | * | 10/1998 | Sidler et al. ...................... 73/862.043 |
| 5,988,000 | * | 11/1999 | Adams ............................. 73/862.044 |

* cited by examiner

*Primary Examiner*—Daniel J. Wu
*Assistant Examiner*—John Tweel, Jr.
(74) *Attorney, Agent, or Firm*—Kanesaka & Takeuchi

(57) ABSTRACT

A seat weight measuring apparatus that simplifies the circuit configuration of the load sensors to reduce the circuit costs and which, when the load sensors fail, immediately detects the failure of the load sensors, thereby improving the reliability. In the case where four load sensors are arranged at four locations, for example front and rear on both sides, of the bottom of the automotive seat, the seat weight measuring apparatus includes two pairs of load sensors, a detection circuit for detecting a difference between outputs from the two antiphase-connected pairs of load sensors, and a seat weight calculator for calculating the weight of the automotive seat based on an output from the detection circuit. This can simplify the circuit configuration and eliminate problems of circuit costs and reliability.

17 Claims, 7 Drawing Sheets

SEAT WEIGHT MEASURING APPARATUS

BACKGROUND OF THE INVENTION

1. Field of the Invention

The present invention relates to an apparatus for measuring a seat weight including a weight of a passenger sitting on an automotive seat and more specifically to a seat weight measuring apparatus with advantages of being able to reduce costs or improve reliability of a circuit portion that determines the weight of the sitting passenger.

2. Description of a Related Art

Automobiles are equipped with seat belts and airbags to secure safety for passengers. In recent years, there is a trend for controlling the operation of such safety devices according to the weight of a passenger for improved performance of seat belts and airbags. For example, the amount of gas introduced into the airbag or an airbag inflating speed and a pre-tension of the seat belt are adjusted according to the weight of a passenger. For that purpose, means are needed for measuring the weight of a passenger sitting on a seat. An example of such means, which has been proposed by the applicant of this invention, involves arranging load sensors (strain gauges) at four corners of the bottom of a seat, measuring vertical loads acting on the strain gauges as voltages by electric circuits, and summing these voltages to determine the seat weight including the weight of a passenger.

First, the basic configuration of the electric circuits used in the above seat weight measuring apparatus will be described.

Figure 9:
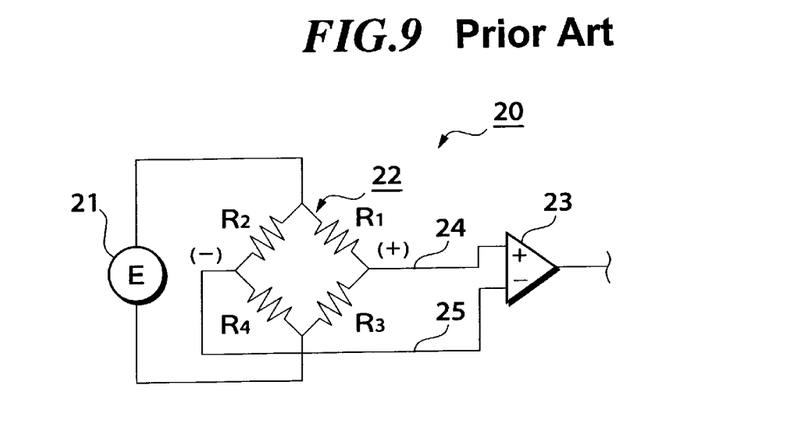
FIG. 9 is a circuit diagram showing a part of a sensor circuit of a seat weight measuring apparatus according to a related art.

FIG. 9 shows a circuit configuration for one load sensor.

This sensor circuit 20 includes a power supply 21 for applying a predetermined voltage, a load sensor 22 of a full bridge configuration having four resistors R1–R4, an amplifier 23 for Amplifying the voltage from the load sensor 22, and a positive polarity wire 24 and a negative polarity wire 25 for connecting the load sensor 22 to the amplifier 23. This load sensor 22 has four strain gauges (not shown) attached to a sensor plate (not shown) that deflects when applied with a load, with a resistance of each resistor R1–R4 changing according to the amount of strain of each strain gauge. The load sensor 22 is formed as a full bridge circuit including four resistors R1–R4 so that it can cancel the strain change due to temperature change and the voltage change of the power supply 21.

Figure 10:
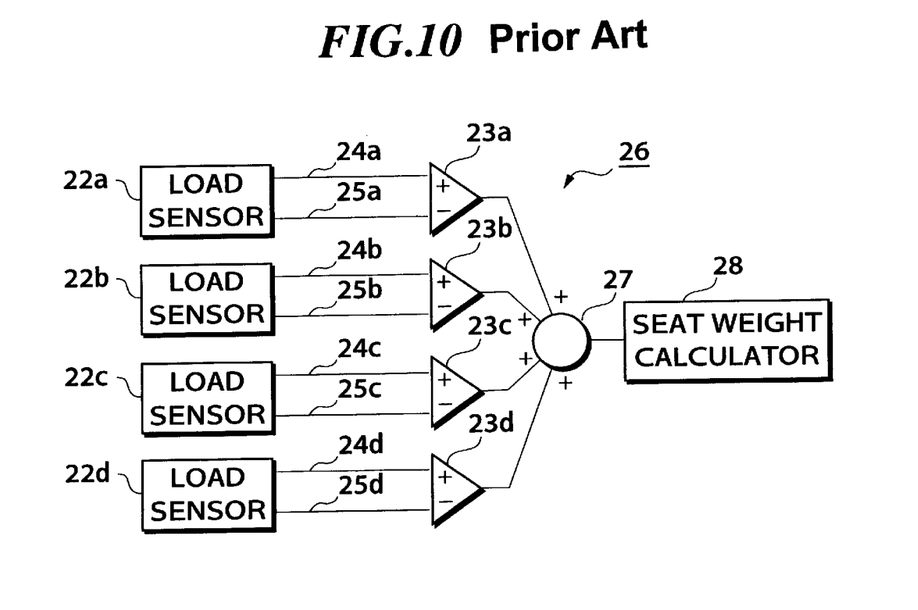
FIG. 10 is a circuit diagram showing an overall sensor circuit of the seat weight measuring apparatus according to a related art.

FIG. 10 shows a circuit configuration for all load sensors incorporated in the seat weight measuring apparatus.

The sensor circuit 26 includes load sensors 22a–22d located at four corners of the bottom of a seat, amplifiers 23a–23d connected to the respective load sensors 22a–22d, positive polarity wires 24a–24d and negative polarity wires 25a–25d for connecting the load sensors 22a–22d to the amplifiers 23a–23d, an adder 27 for adding up voltages output from the amplifiers 23a–23d, and a seat weight calculator 28 for determining the weight of the seat based on the voltage from the adder 27. Each of the load sensors 22a–22d is supplied with a predetermined voltage.

In FIGS. 9 and 10, the strain gauges forming the load sensor 22 are deformed by a vertical load from the seat (not shown). The amounts of strain of the strain gauges determine the resistances of the resistors R1–R4 of the load sensor 22. When a predetermined voltage is applied from the power supply 21 to the load sensor 22 as a resistor circuit, a voltage as determined by the supply voltage and the resistances (R1–R4) is applied to the amplifier 23, which amplifies the voltage before outputting it to the adder 27. The adder 27 adds up voltages from the four amplifiers 23a–23d and outputs the sum voltage to the seat weight calculator 28. The seat weight calculator 28 calculates the weight of the seat according to the voltage from the adder 27.

In this way, the load from the seat can be measured by the load sensors located at four corners of the bottom of the seat.

In the seat weight measuring apparatus such as shown in FIGS. 9 and 10, however, each of the load sensors requires one amplifier and two wires (for a positive polarity and a negative polarity). Thus, a total of four amplifiers and eight wires are needed, giving rise to a problem of increased circuit and wiring costs. As the number of constitutional components increases, the probability of parts failure also increases, deteriorating the overall reliability of the sensor.

Japanese Patent Publication No. JP-A-10-297334 discloses a passenger weight detection apparatus that calculates a gravity center of a loaded seat based on a seat weight detected from a load acting on a front part of the seat and a seat weight detected from a load acting on a rear part of the seat and which corrects the seat weight according to the calculated gravity center and then, based on the corrected seat weight, estimates the weight of a passenger.

This official gazette, however, does not disclose a circuit configuration of the passenger weight detection apparatus. If a circuit configuration such as shown in FIGS. 9 and 10 is used, this apparatus still has drawbacks of increased circuit and wiring costs and, because of a large number of constitutional parts, increased probability of parts failure which in turn degrades the overall reliability of the sensor.

SUMMARY OF THE INVENTION

The present invention has been accomplished with a view to overcoming these problems and its objective is to provide a seat weight measuring apparatus that can simplify the wiring between the sensors and the amplifiers and the sensor circuit configuration to reduce the circuit costs and improve the reliability. It is also an object of this invention to provide a seat weight measuring apparatus which, in the event of a failure of the load sensors, can immediately detect the sensor failure thereby improving the reliability.

To achieve the above objectives, the seat weight measuring apparatus according to the present invention, which measures a weight of an automotive seat including a weight of a passenger sitting on the automotive seat by detecting loads at a plurality of portions of the automotive seat, includes: a plurality of load sensors arranged at the plurality of portions of the automotive seat, each load sensor having at least one of a first output terminal and a second output terminal, the first and second output terminals having opposite polarities to each other; a detection means for detecting a difference between a signal output from the first output terminal of one load sensor and a signal output from the second output terminal of another load sensor; and a calculation means for calculating the weight of the automotive seat based on an output from the detection means.

According to the present invention, an output of one load sensor is connected in opposite polarity with respect to an output of another load sensor to form a bridge circuit as a whole. This can simplify the circuit configuration of the seat weight measuring apparatus. Further, because the circuit can be formed integral with the load sensors, the number of wires and components can be reduced, which in turn eliminates the problems of circuit costs and reliability.

DESCRIPTION OF THE PREFERRED EMBODIMENTS

Embodiments of the seat weight measuring apparatus of this invention will be described in detail by referring to the accompanying drawings.

Figure 1:
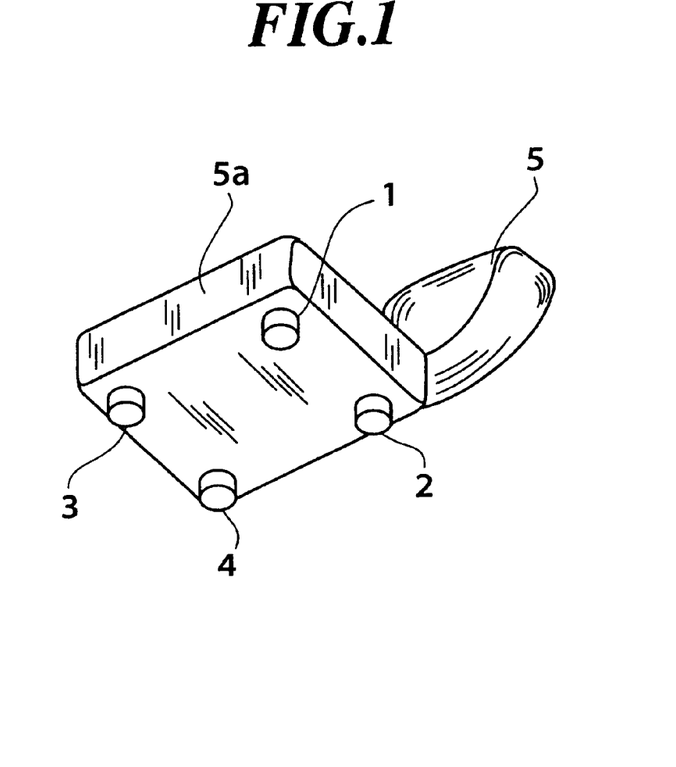
FIG. 1 is an outline perspective view showing an example installation of load sensors of a seat weight measuring apparatus according to the present invention.

FIG. 1 is a schematic view showing an example arrangement of load sensors of the seat weight measuring apparatus as one embodiment of this invention. As shown in FIG. 1, load sensors 1–4 of the seat weight measuring apparatus are located at four corners of the bottom of a seat cushion 5a of a seat 5. Alternatively, they may be arranged at four corners below seat rails.

Figure 2:
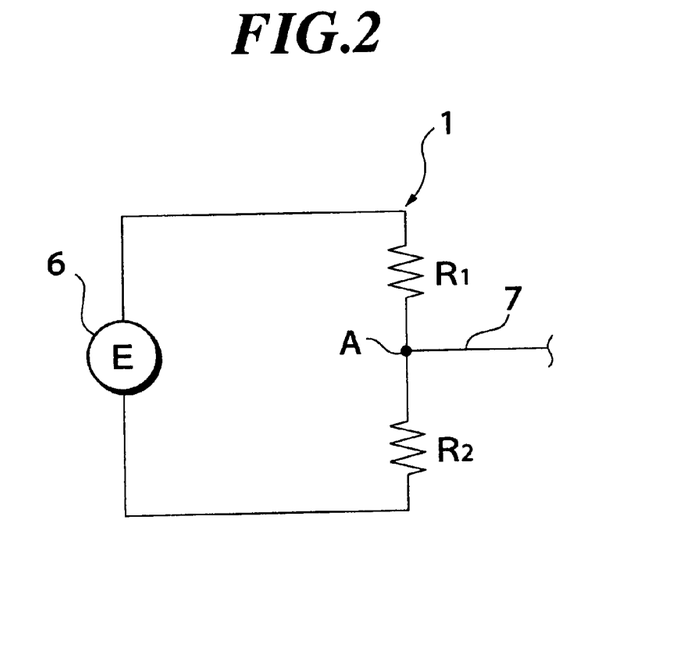
FIG. 2 is a circuit diagram showing a part of a sensor circuit of a seat weight measuring apparatus according to one embodiment of the present invention.

FIG. 2 is a circuit diagram showing a part of an electric circuit of a load sensor 1.

This circuit, includes a power supply 6 for applying a predetermined voltage E, a load sensor 1 of a half bridge configuration consisting of two resistors R1, R2, and a wire 7 connected to a joint A between the two resistors R1 and R2 of the load sensor 1. This load sensor 1 has two strain gauges (not shown) attached to a sensor plate (not shown) that deflects upon application of load. The resistances of the resistors R1 and R2 change according to the amount of strain of each strain gauge. The joint A has a potential of E/2 when a passenger is not seated on the seat cushion 5a of the seat 5. With the load sensor 1 formed as a half bridge circuit consisting of two resistors R1 and R2, changes in the resistance value due to temperature change can be canceled.

Electric circuits of other load sensors 2–3 are also formed as a half bridge configuration having two resistors.

Figure 3:
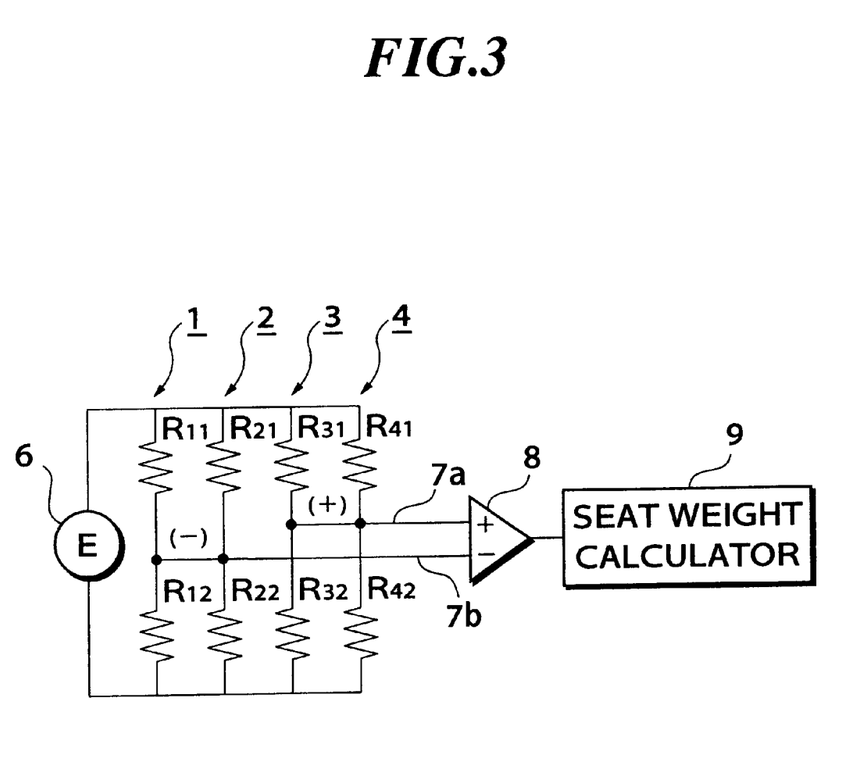
FIG. 3 is a circuit diagram showing an overall sensor circuit of a seat weight measuring apparatus according to one embodiment of the present invention.

FIG. 3 is a circuit diagram showing a sensor circuit combining four load sensors.

This sensor circuit comprises a power supply 6 for supplying a predetermined voltage E, load sensors 1–4 each formed as a half bridge configuration having two resistors Rx1 and Rx2 (x=1, 2, 3, 4), a wire 7b connected to resistors Rx1 and Rx2 of the load sensors 1 and 2 on the left side of the seat 5 (see FIG. 1), a wire 7a connected to resistors Rx1 and Rx2 of the load sensors 3 and 4 on the right side of the seat 5 (see FIG. 1), a detection circuit 8 in the form of a differential amplifier having a non-inverted input connected to the wire 7a and an inverted input connected to the fire 7b, and a seat weight calculator 9 for determining the weight of the seat on the basis of the voltage output from the detection circuit 8. The first subscript x of the resistor R represents the position of a load sensor (a load sensor number) and the second subscript 1 or 2 represents a position in the half bridge.

In the above circuit configuration, a set of the load sensors 1 and 2 (left side) and a set of load sensors 3 and 4 (right side) are of opposite polarities (i.e., in FIG. 3 the right sensors.3, 4 have a positive polarity and the left sensors 1, 2 a negative polarity). In such a configuration, a voltage change due to changes in resistances of the load sensors 1, 2 and a voltage change due to changes in resistances of the load sensors 3, 4 are ultimately summed up at an output of the differential amplifier as the detection circuit 8. That is, the output voltages of opposite phases from the load sensors 1, 2 and the load sensors 3, 4 are subtracted from each other by the differential amplifier thus adding up the loads measured by the load sensors 1–4. Because the four load sensors 1–4 combine to form one full bridge circuit, the voltage change of the power supply 6 is canceled. The seat weight calculator 9 can calculate the weight of the seat 5 (FIG. 1) based on the output voltage of the detection circuit 8. The detection circuit 8 may be a combination of a single-input amplifier and a subtraction circuit, rather than a differential amplifier.

Forming each of the load sensors 1–4 in a half bridge circuit configuration consisting of two resistors as described above can cancel the strain change due to temperature change, and constructing the four load sensors 1–into one full bridge circuit can cancel the voltage change of the power supply 6. Furthermore, this configuration enables the number of the detection circuits 8 to be reduced from conventional four to one and also the number of wires leading from the load sensors 1–4 to the detection circuit 8 to be reduced from conventional eight to two, i.e., the positive polarity wire 7a and the negative polarity wire 7b. This simplifies the circuit configuration, reduces the circuit cost, and improves reliability.

A passenger sitting on the automotive seat 5 normally moves in a longitudinal direction but rarely in the lateral direction. Hence, it is preferable that the front load sensor 1 or 3 and the rear load sensor 2 or 4 are paired. That is, as shown in FIG. 3, a combination may preferably be made between the load sensors 1 and 2 and between the load sensors 3 and 4 (two pairs on the left and right side) or between the load sensors 1 and 4 and between the load sensors 2 and 3 (two diagonally crossing pairs). With such combinations, one pair of load sensors represents almost one half of the seat weight.

Figure 4A:
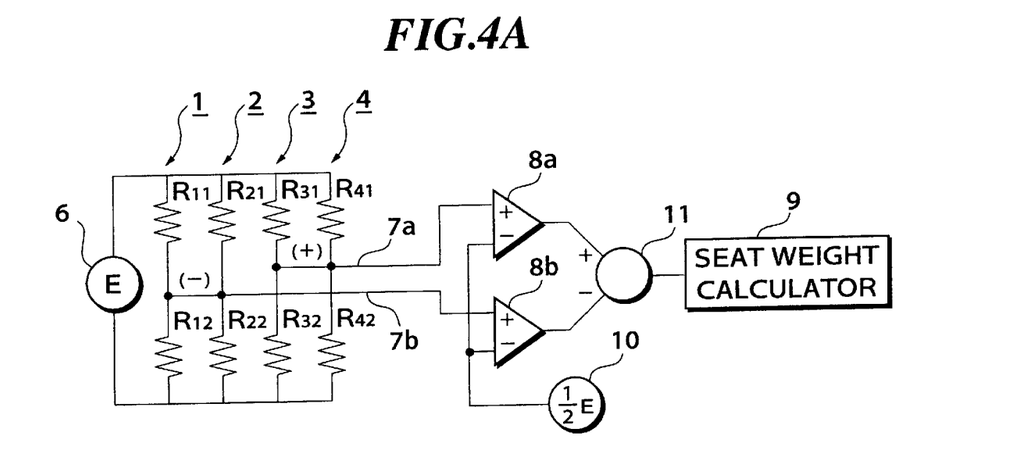
FIGS. 4A and 4B are circuit diagrams showing sensor circuits of a seat weight measuring apparatus according to another embodiment of the present invention.

FIG. 4A represents another embodiment, which includes two amplifiers 8a and 8b and an adder/subtracter 11, in place of the detection circuit 8 used in the circuit configuration of FIG. 3.

In FIG. 4A, two amplifiers 8a, 8b are used to form one detection circuit, in which the wire 7a is connected to a non-inverted input of the amplifier 8a and the wire 7b is connected to a non-inverted input of the amplifier 8b. Further, a power supply (or voltage divider circuit) 10 is provided that applies one half of the voltage E of the power supply 6 (E/2) to inverted inputs of the amplifiers 8a and 8b.

The amplifiers 8a, 8b detect differences between the voltages from the load sensors and the voltage from the power supply 10 and amplify the detected differences before outputting them to the adder/subtracter 11. The adder/subtracter 11 calculates these voltage differences and outputs the result to the seat weight calculator 9. The seat weight calculator 9 calculates the weight of the seat 5 according to the applied voltage. Here, it is possible to reverse the connections of the non-inverted input and the inverted input in one of the amplifiers 8a, 8b and have the adder/subtracter 11 calculate the sum of the output voltages of the amplifiers 8a, 8b.

In FIG. 4A, the configuration of the power supply 6 and the load sensors 1–4 is the same as that of the circuit of FIG. 3. The voltage of the power supply 10 is intended to detect the difference between it and the voltages of the load sensors and may be adjusted according to the voltages of the load sensors.

As shown in FIG. 4A, the left and right load sensor pairs (a pair of load sensors 1 and 2 and a pair of load sensors 3 and 4) are connected with the amplifiers 8a and 8b, respectively, to allow the seat weight calculator 9 to monitor the balance of the weight values from the load sensor pairs.

For example, in the event of a failure of the load sensor 1, the voltage from the wire 7b comes only from the load sensor 2, so that a significant difference occurs between the output voltage of the amplifier 8a and the output voltage of the amplifier 8b. Hence, if such a state continues not just temporarily but for a predetermined period of time, the seat weight calculator 9 can decide that an abnormal condition has occurred with the left pair (a set of load sensors 1 and 2).

Figure 4B:
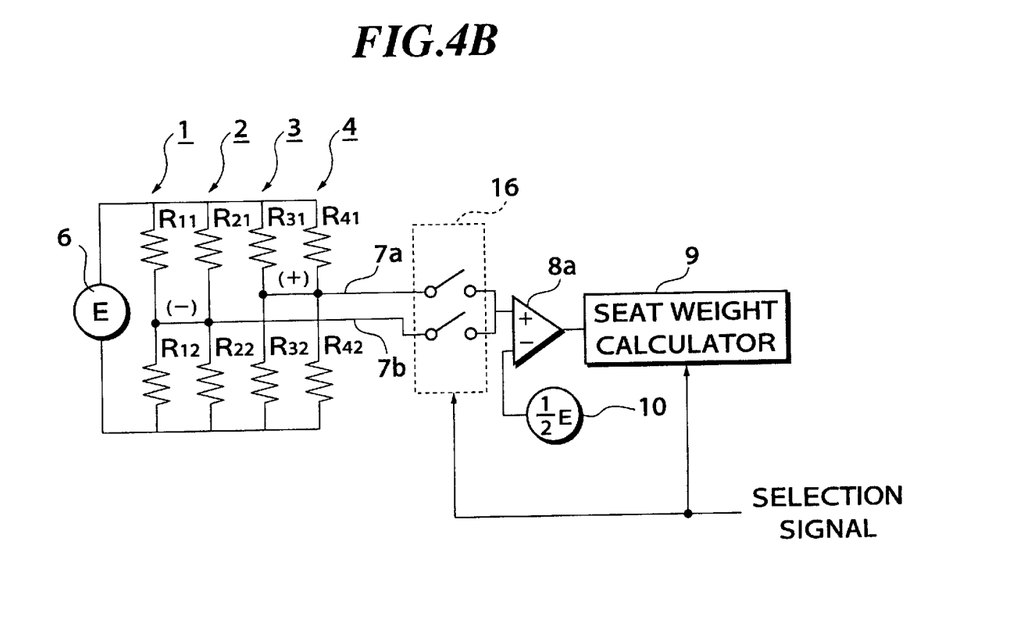

FIG. 4B shows another embodiment in which the detection circuit 8 in the circuit configuration of FIG. 3 is replaced with a selection circuit 16 and an amplifier 8a.

In FIG. 4B, the selection circuit 16 is provided between the wires 7a, 7b and the amplifier 8a and is connected to the non-inverted input of the amplifier 8a. Further, the power supply (or voltage divider circuit) 10, which supplies one half of the voltage E of the power supply 6 (E/2), is connected to the inverted input of the amplifier 8a.

The configuration of the power supply 6 and the load sensors 1–4 is the same as that of FIG. 3. The voltage of the power supply 10 is intended to detect the difference between it and the voltages of the load sensors and may be adjusted according to the voltages of the load sensors.

The amplifier 8a is applied with the voltage (e/2) from the power supply 10 and also with a signal from the wire 7a or 7b. The selection circuit 16 is operable to alternately select between a signal from the wire 7a and a signal from the wire 7b in accordance with a selection signal and send the selected signal to the amplifier 8a where it is amplified before being output to the seat weight calculator 9. The seat weight calculator 9, according to an applied selection signal, performs addition and subtraction operations on the amplified signal from the wire 7a and the wire 7b alternately to calculate the weight of the seat 5. In this way, the weight of the seat can be determined in a manner similar to the circuits of FIG. 3 and FIG. 4A.

In the circuit shown in FIG. 4B, because the selection circuit 16 alternately outputs a signal from the wire 7a and the wire 7b, there is an advantage that only one amplifier 8a is required.

Figure 5:
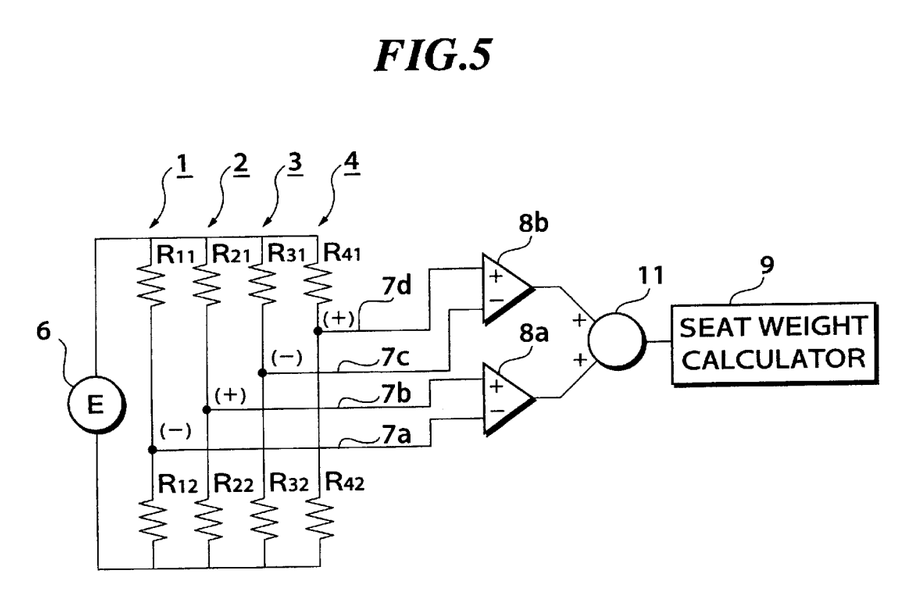
FIG. 5 is a circuit diagram showing a sensor circuit of a seat weight measuring apparatus according to still another embodiment of the present invention.

FIG. 5 is a circuit diagram showing a sensor circuit using four load sensors 1–4 to form two full bridges.

This sensor circuit includes: a power supply 6 for applying a predetermined voltage E; load sensors 1–4 each of a half bridge configuration having two resistors Rx1 and Rx2 (x=1, 2, 3, 4); wires 7a–7d connected to the resistors Rx1 and Rx2 of each of the load sensors 1–4; an amplifier 8a having an inverted input connected to the wire 7a and a non-inverted input connected to the wire 7b; an amplifier 8b having an inverted input connected to the wire 7c and a non-inverted input connected to the wire 7d; an adder/subtracter 11 for adding up voltages output from the amplifiers 8a and 8b; and a seat weight calculator 9 for calculating the weight of the seat based on the voltage from the adder/subtracter 11. Here, it is possible to reverse the connections of the non-inverted input and the inverted input in one of the amplifiers 8a, 8b and have the adder/subtracter 11 calculate the difference between the output voltages of the amplifiers 8a, 8b.

As shown in FIG. 5, forming each of the load sensors 1–4 as a half bridge circuit configuration consisting of two resistors can cancel the strain change due to temperature change, and constructing one full bridge circuit by the load sensors 1, 2 and another by the load sensor 3, 4 can cancel the voltage change of the power supply 6. Further, by connecting the amplifiers 8a, 8b to the left and right pairs (a set of load sensors 1, 2 and a set of load sensors 3, 4) respectively, the seat weight calculator 9 can monitor the balance of weight values from these pairs to detect any abnormal condition or failure in each pair of the load sensors, thus improving reliability. Further, this circuit configuration can reduce the number of amplifiers from conventional four to two and also the number of wires leading from the load sensors 1–4 to the amplifiers from conventional eight to four, thus simplifying the circuit configuration, reducing the circuit costs and improving the reliability.

Figure 6:
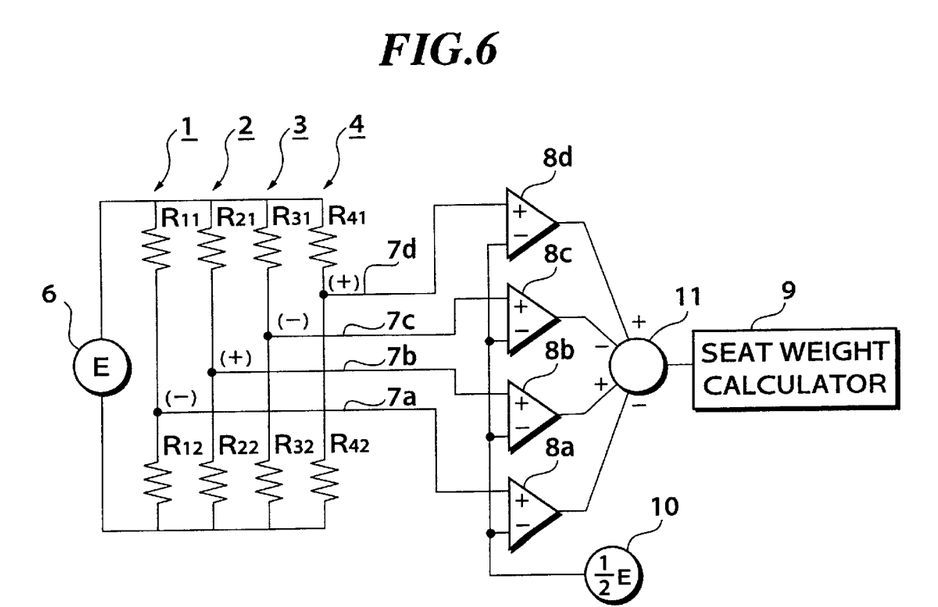
FIG. 6 is a circuit diagram showing a sensor circuit of a seat weight measuring apparatus according to a further embodiment of the present invention.

FIG. 6 is a circuit diagram showing a sensor circuit using four load sensors 1–4 to form two full bridges.

This sensor circuit includes: a power supply 6 for applying a predetermined voltage E; load sensors 1–4 each of a half bridge configuration having two resistors Rx1 and Rx2 (x=1, 2, 3, 4); wires 7a7d connected to the resistors Rx1 and Rx2 of each of the load sensors 1–4; amplifiers 8a8d having non-inverted inputs connected to the wires 7a7d respectively; a power supply 10 (or voltage divider circuit) for applying one half of the voltage of the power supply 6 (E/2) to the inverted inputs of the amplifiers 8a8d; an adder/subtracter 11 for performing addition and subtraction operations on voltages output from the amplifiers 8a8d; and a seat weight calculator 9 for calculating the weight of the seat based on the voltage from the adder/subtracter 11. Here, it is possible to reverse the connections of the non-inverted input and the inverted input in the amplifiers 8a and 8b or in the amplifiers 8b and 8d and have the adder/subtracter 11 calculate the sum of the output voltages of the amplifiers 8a8d.

As shown in FIG. 6, connecting one amplifier 8a8d to each of the load sensors 1–4 allows the seat weight calculator 9 to monitor the balance of the weight values from the load sensors 1–4. Hence, the seat weight calculator 9 can detect an anomaly or failure for each of the load sensors 1–4, thus enhancing the reliability. It is also possible to use the selection circuit 16 of FIG. 4B to reduce the number of amplifiers to one.

Figure 7:
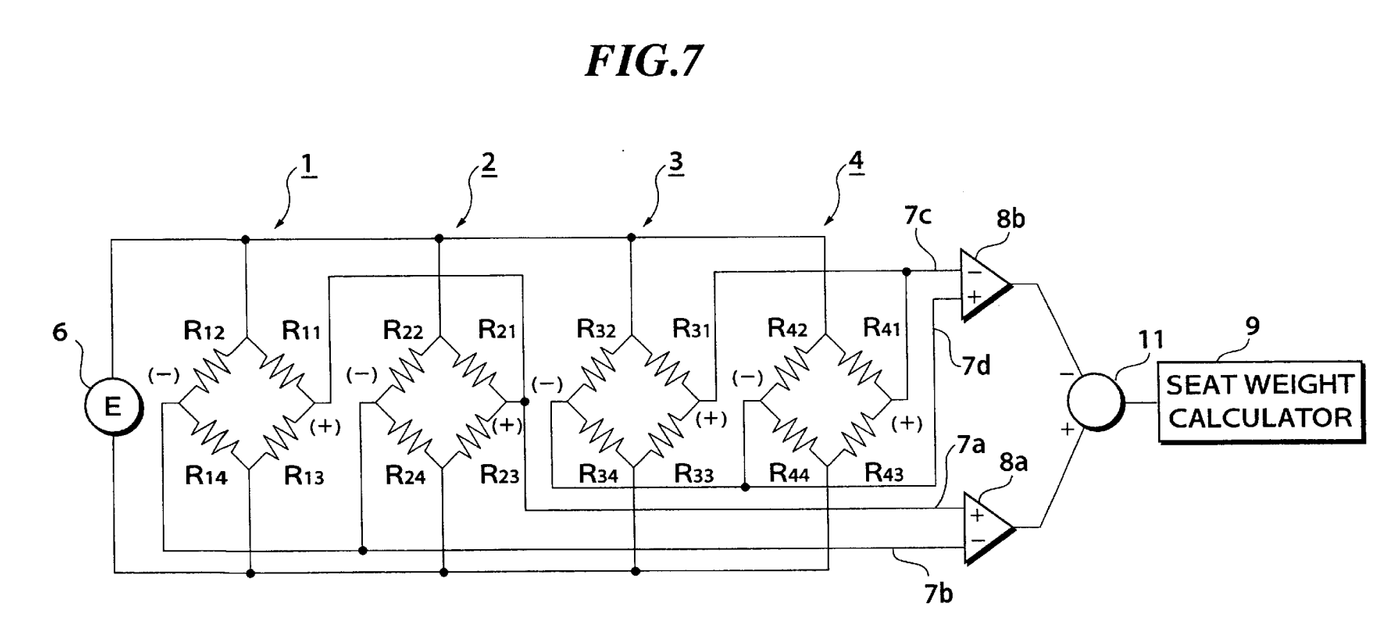
FIG. 7 is a circuit diagram showing a sensor circuit of a seat weight measuring apparatus according to a further embodiment of the present invention.

FIG. 7 is a circuit diagram showing a sensor circuit where each of the four load sensors is of a full bridge configuration.

This sensor circuit includes: a power supply 6 for applying a predetermined voltage E; load sensors 1–4 each having of a full bridge configuration having four resistors Rx1, Rx2, Rx3 and Rx4 (x=1, 2, 3, 4); a wire 7a connected to the resistors Rx1 and Rx3 of each of the load sensors 1, 2; a wire 7b connected to the resistors Rx2 and Rx4 of each of the load sensors 1, 2; a wire 7c connected to the resistors Rx1 and Rx3 of each of the load sensors 3, 4; a wire 7d connected to the resistors Rx2 and Rx4 of each of the load sensors 3, 4; an amplifier 8a having a non-inverted input connected to the wire 7a and an inverted input connected to the wire 7b; an amplifier 8b having an inverted input connected to the wire 7c and a non-inverted input connected to the wire 7d; an adder/subtracter 11 for performing a subtraction operation on the voltages output from the amplifiers 8a and 8b; and a seat weight calculator 9 for calculating the weight of the seat based on the voltage from the adder/subtracter 11. Here, it is possible to reverse the connections of the non-inverted input and the inverted input in one of the amplifiers 8a and 8b and have the adder/subtracter 11 calculate the sum of the output voltages of the amplifiers 8a and 8b.

As shown in FIG. 7, forming each of the load sensors 1–4 in a full bridge circuit configuration having four resistors can cancel the strain change due to temperature change and the voltage change of the power supply 6. Further, connecting the amplifiers 8a, 8b to the left and right pairs of the load sensors (a set of load sensors 1, 2 and a set of load sensors 3, 4) respectively allows the seat weight calculator 9 to monitor the balance of the weight values from these pairs and thereby detect an anomaly or failure in each pair of the load sensors, which in turn enhances reliability. Further, this configuration can reduce the number of amplifiers from conventional four to two and also the number of wires leading from the load sensors 1–4 to the amplifiers from conventional eight to four, thus simplifying the circuit configuration, reducing the circuit costs and improving the reliability.

Figure 8A:
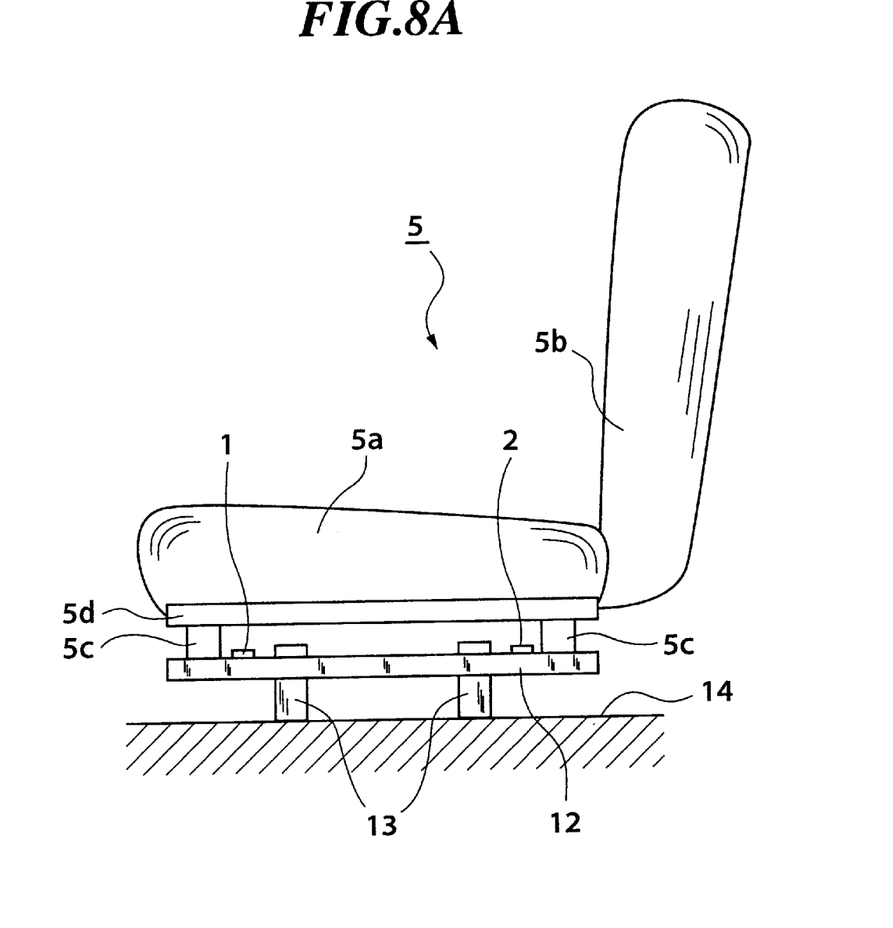
FIGS. 8A and 8B are schematic diagrams showing an example arrangement of load sensors of a seat weight measuring apparatus according to the present invention.
Figure 8B:
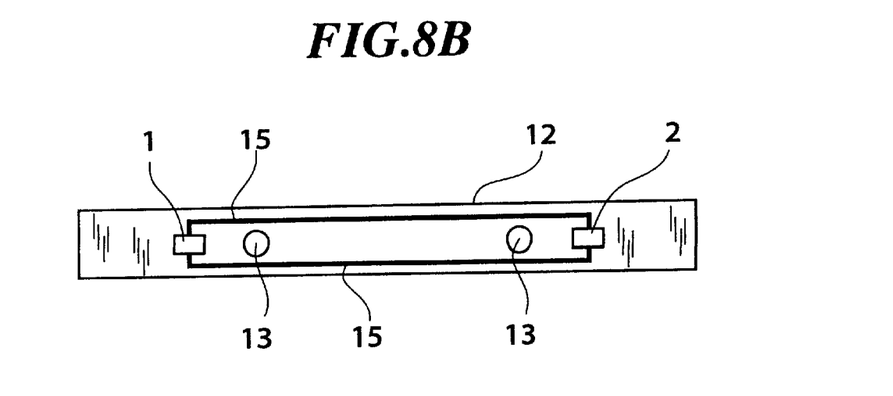

FIGS. 8A and 8B show one example arrangement in which the load sensors are mounted on seat rails beneath the seat. FIG. 8A is a side view showing schematically the overall construction of the seat and FIG. 8B is a plan view of a sensor unit.

In FIG. 8A, a seat unit 5 includes a seat cushion 5a on which a passenger is seated, a seat back 5b against which the passenger rests his or her back, seat rails 5d, and seat legs 5c projecting from the bottom of the seat rails 5d at four locations, front and rear on both sides. The front and rear seat legs 5c on each side of the seat 5 are secured to one sensor unit 12 by screws (not shown). While FIG. 8A shows only the left side, the right side has the similar construction to the left side. Such an illustrative relation also applies to other portions to be described below. The sensor unit 12 is fixed to brackets 13 projecting from a car body 14.

In FIG. 8B, the sensor unit 12 has load sensors (strain gauges) 1 and 2 and a printed circuit 15 that is electrically connected to the load sensors 1, 2 to form a predetermined circuit.

As shown in FIGS. 8A and 8B, because the load sensors 1, 2 (load sensors 3, 4 on the far side) can be mounted on the sensor unit 12 and a predetermined circuit wired within the sensor unit 12, the installation and wiring of the load sensor are facilitated. Further, integrally forming the load sensors and wires in one piece by a printing technique allows two sensors to be formed as one circuit, lowering the production cost of the sensor circuit.

A plurality of embodiments of the seat weight measuring apparatus according to the present invention have been described. The load sensor pairing may be made either between the load sensors 1 and 2 and between the load sensors 3 and 4 (two parallel pairs on the left and right sides), or between load sensors 1 and 4 and between load sensors 2 and 3 (two pairs diagonally crossing each other). That is, it is preferable that one of the front sensors and one of the rear sensors are combined to produce two pairs of the sensors. Although the foregoing description concerns embodiments having four load sensors, the present invention can generally be applied to a seat weight measuring apparatus with a plurality of load sensors.

As described above, according to the present invention, a difference is detected between a signal output from a positive polarity output terminal of one load sensor and a signal output from a negative polarity output terminal of another load sensor among a plurality of load sensors used in the seat weight measuring apparatus. Therefore, it is possible to simplify the circuit configuration, reduce circuit costs and improve reliability. When the seat weight measuring apparatus includes four load sensors, one of the front load sensors and one of the rear load sensors should preferably be combined to form two pairs of load sensors. These pairs are each provided with an associated circuit to enable anomaly or failure to be detected for each pair, thereby improving reliability.

Further, according to the present invention, because a circuit of a predetermined configuration can be wired by a printing technique within the same base or within the same unit in which the load sensors are formed, the installation and wiring of the load sensors can be facilitated. The printed wiring can also reduce the production cost of the circuit.

What is claimed is:

1. An apparatus for measuring a weight of an automotive seat including a weight of a passenger sitting on the automotive seat by detecting loads at a plurality of portions of the automotive seat, said apparatus comprising:

a plurality of load sensors arranged at the plurality of portions of the automotive seat, each of said plurality of the load sensors having at least one of a first output terminal and a second output terminal, the first and second output terminals having opposite polarities to each other;

a detection means for detecting a difference between a signal output from the first output terminal of one of said plurality of load sensors and a signal output from the second output terminal of another of said plurality of load sensors; and a calculation means for calculating the weight of the automotive seat based on an output from the detection means.

2. An apparatus according to claim 1, wherein said load sensors include a first pair of load sensors and a second pair of load sensors, said detection means detects a difference between a signal output from the first output terminal of the first pair of the load sensors and a signal output from the second output terminal of the second pair of the load sensors.

3. An apparatus according to claim 2, wherein the first pair of load sensors is located at a front of the automotive seat and the second pair of load sensors is located at a rear of the automotive seat.

4. An apparatus according to claim 1, wherein:

each of said plurality of load sensors has a first resistor and a second resistor respectively having resistances changing according to the amount of strain;

the first output terminal is connected to a first potential through the first resistor and to a second potential through the second resistor; and the second output terminal is connected to the first potential through the second resistor and to the second potential through the first resistor.

5. An apparatus according to claim 2, wherein:

each of said plurality of load sensors has a first resistor and a second resistor respectively having resistances changing according to the amount of strain;

the first output terminal is connected to a first potential through the first resistor and to a second potential through the second resistor; and the second output terminal is connected to the first potential through the second resistor and to the second potential through the first resistor.

6. An apparatus according to claim 3, wherein:

each of said plurality of load sensors has a first resistor and a second resistor respectively having resistances changing according to the amount of strain;

the first output terminal is connected to a first potential through the first resistor and to a second potential through the second resistor; and the second output terminal is connected to the first potential through the second resistor and to the second potential through the first resistor.

7. An apparatus according to claim 1, wherein said calculation means compares signals output from the plurality of the load sensors with each other so as to diagnose an anomaly or failure in each of the plurality of load sensors.

8. An apparatus according to claim 2, wherein said calculation means compares signals output from the first and second pairs of load sensors with each other so as to diagnose an anomaly or failure in each of the first and second pairs of load sensors.

9. An apparatus according to claim 3, wherein said calculation means compares signals output from the first and second pairs of the load sensors with each other so as to diagnose an anomaly or failure in each of the first and second pairs of the load sensors.

10. An apparatus according to claim 2, wherein:

each of the load sensors is a strain gauge including a strain detection resistor; and each of the first and second pairs of load sensors is formed by connecting in series or in parallel the strain detection resistors of the strain gauges located at two portions of the automotive seat.

11. An apparatus according to claim 3, wherein each of the load sensors is a strain gauge including a strain detection resistor; and each of the first and second pairs of load sensors is formed by connecting in series or in parallel the strain detection resistors of the strain gauges located at two portions of the automotive seat.

12. An apparatus according to claim 1, wherein each of the load sensors is a strain gauge including a strain detection resistor; and strain detection resistors of the strain gauges located at a plurality of portions of the automotive seat are connected in a full bridge configuration.

13. An apparatus according to claim 2, wherein:

each of the load sensors is a strain gauge including a strain detection resistor; and each of the first and second pairs of load sensors is formed by connecting in a full bridge configuration the strain detection resistors of the strain gauges located at two portions of the automotive seat.

14. An apparatus according to claim 3, wherein:

each of the load sensors is a strain gauge including a strain detection resistor; and each of the first and second pairs of load sensors is formed by connecting in a full bridge configuration the strain detection resistors of the strain gauges located at two portions of the automotive seat.

15. An apparatus according to claim 1, wherein, among said plurality of load sensors, two load sensors located at two portions on a same side of the automotive seat are integrally provided on one and a same base.

16. An apparatus according to claim 2, wherein, among said plurality of load sensors, two load sensors located at two portions on a same side of the automotive seat are integrally provided on one and a same base.

17. An apparatus according to claim 3, wherein, among said four load sensors, two load sensors located at two portions on a same side of the automotive seat are integrally provided on one and a same base.

* * * * *